United States Patent [19]

Stebens et al.

[11] Patent Number: 4,633,399
[45] Date of Patent: Dec. 30, 1986

[54] METHOD OF SEISMIC DATA ENHANCEMENT USING A PHASE OF RECTIFIED TRACE SEISMIC PARAMETER

[75] Inventors: Beverly Stebens; Roger K. Parsons; Robert T. Baumel; Donna K. Terral, all of Ponca City, Okla.; Matthew J. Yedlin, Vancouver, Canada

[73] Assignee: Conoco Inc., Ponca City, Okla.

[21] Appl. No.: 574,059

[22] Filed: Mar. 5, 1984

[51] Int. Cl.⁴ .................................................. G01V 1/28
[52] U.S. Cl. ...................................... 364/421; 367/48; 367/68; 367/70; 381/70; 381/71
[58] Field of Search ................... 364/421; 367/48, 68, 367/70; 381/70, 71

[56] References Cited

U.S. PATENT DOCUMENTS

| | | | |
|---|---|---|---|
| 3,975,705 | 8/1976 | Klein, Jr. et al. | 367/70 |
| 3,995,312 | 11/1976 | Hubbard et al. | 367/70 |
| 4,064,361 | 12/1977 | Kustka et al. | 375/96 X |
| 4,070,187 | 1/1978 | Klein, Jr. et al. | 367/70 |
| 4,410,764 | 10/1983 | Werth et al. | 381/108 X |
| 4,439,737 | 3/1984 | Mattei | 375/81 X |
| 4,464,770 | 8/1984 | Maurer et al. | 375/119 |
| 4,467,461 | 8/1984 | Rice et al. | 367/70 |
| 4,525,862 | 6/1985 | Parker | 455/47 |

FOREIGN PATENT DOCUMENTS 1362670 8/1974 United Kingdom ............... 364/421

Primary Examiner—Jerry Smith
Assistant Examiner—Charles B. Meyer
Attorney, Agent, or Firm—Charles E. Quarton

[57] ABSTRACT

A method for developing a novel seismic data attribute enables improvements in seismic data processing and interpretation. Seismic signals or trace data are first rectified and then Hilbert transformed and processed with the arc tangent function to develop a new instantaneous phase parameter referred to as phase of rectified trace (PORT). Output data may be further enhanced with tri-modal, interactive color display.

5 Claims, 9 Drawing Figures

PRIOR ART PROCESSING

METHOD OF SEISMIC DATA ENHANCEMENT USING A PHASE OF RECTIFIED TRACE SEISMIC PARAMETER

BACKGROUND OF THE INVENTION

1. Field of the Invention

The invention relates generally to processing and display of seismic data and, more particularly, but not by way of limitation, it relates to the development of a new form of seismic data parameter that may be developed from seismic trace data to enable enhanced interpretive processing and display.

2. Description of the Prior Art

There is no known prior art that relates to development of such as the newly discovered seismic parameter which is referred to under the acronym PORT, VIZ. phase of rectified trace. Prior art of interest is the publication entitled "Complex Seismic Trace Analysis" by Taner, Koehler and Sheriff, GEOPHYSICS, Vol. 44, No. 6, June 1979, pp. 1041-1063. The prior publication relates to a prior art type of calculation technique for developing the instantaneous phase attribute for a selected section of seismic trace data. The prior art teaching is well-known and has been used variously in geophysical processing by various entities. The old phase development technique is a two-step process wherein a seismic trace is first Hilbert transformed and, thereafter, the resulting data is processed through determination of the ratio of the Hilbert transform to the trace data with subsequent taking of the arc tangent of the ratio to develop an instantaneous phase attribute.

SUMMARY OF THE INVENTION

The present invention relates to development of an improved form of instantaneous phase attribute or parameter wherein final output is much enhanced by increased noise suppression and apparent resolution of data. The invention consists of a method for processing seismic trace data by rectifying, Hilbert transforming and final determination as an arc tangent function to thereby develop a new phase parameter.

Therefore, it is an object of the present invention to provide a method for enhancing visual display of seismic data.

It is also an object of the present invention to provide a relatively simple data process that yields much improved signal to noise ratio in output presentation.

It is still further an object of this invention to provide a new instantaneous phase determination method that may be used specifically as a bright spot enhancer.

Finally, it is an object of the present invention to provide a method for developing a new instantaneous phase attribute for a seismic trace, which the new phase parameter is of great assistance in delineation of faults and other complex geological structures.

Other objects and advantages of the invention will be evident from the following detailed description when read in conjunction with the accompanying drawings which illustrate the invention.

DETAILED DESCRIPTION OF THE INVENTION

Figure 1:
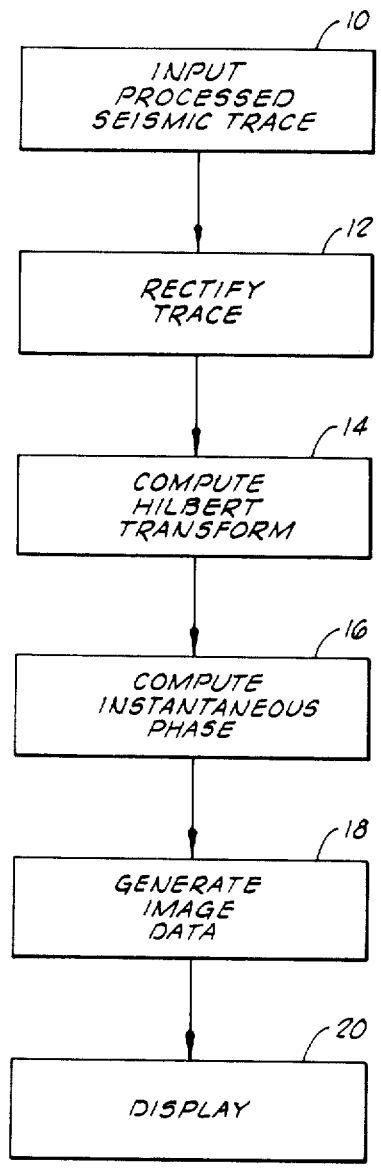
FIG. 1 is a flow diagram of the procedural steps of the present invention.

FIG. 1 illustrates the processing flow for the calculation of new phase utilizing the standard phase calculation technique but including the prior step of determining the absolute data values. Thus, pre-processed seismic trace data is input and available at processing stage 10. The seismic trace data at stage 10 may have received any of various prior correction and processing treatments but consists essentially of ordered trace data that is related to a particular seismic section or line of survey. In addition, the input seismic trace data at stage 10 may consist of a selected continuous plane of data as derived from three dimensional seismic trace data.

The input seismic trace data is then rectified in flow stage 12; i.e. the absolute values of the trace data are taken and presented as input to flow stage 14 wherein the data is Hilbert transformed. The Hilbert transform in stage 14 effects a positive phase rotation of $\pi/2$ radians of the absolute value trace data. Thereafter, the Hilbert transformed data is processed in flow stage 16 such that the pointwise ratio of the Hilbert transform of the rectified trace in comparison to the rectified trace is computed, and the phase is then obtained by taking the arc tangent of this ratio. Numerous computer programs and/or routines are available for selection to carry out the operations of computation of Hilbert transform as well as calculation with the arc tangent function (ATAN2).

New instantaneous phase data is output from stage 16 and this data may then be utilized for further interpretive processing and/or display. In particular, the new instantaneous phase output from flow stage 16 is input to flow stage 18 whereupon image data is generated for the new instantaneous phase data. Such image data in flow stage 18 may include rasterization formatting for input of new phase data to the flow stage 20, an output display that may be any variable intensity plotting device such as an Applicon ink-jet printer, a laser film plotter, or any of a number of video display systems. In one embodiment, the function of flow stages 18 and 20 may be readily carried out utilizing well-known types of video monitor system, e.g. the I²S model 70 Image Process Computer as commercially available from International Imaging Systems.

Figure 2:
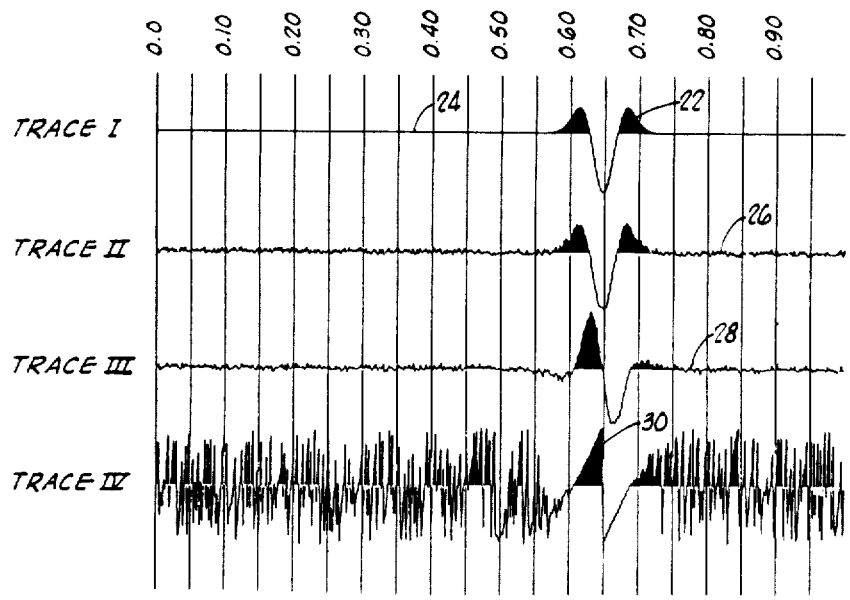
FIG. 2 is a graphic depiction of traces I-IV versus time in development of the old or prior type of instantaneous phase data signal.
Figure 3:
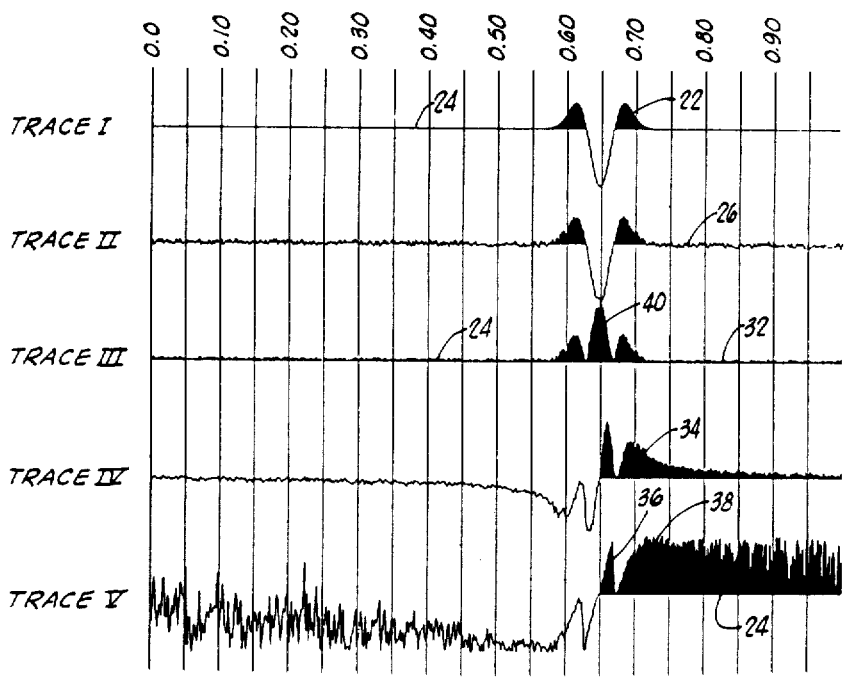
FIG. 3 is a graphic illustration of traces I-V versus time showing the development of a new instantaneous phase data signal.

FIGS. 2 and 3 provide a graphic representation of the development of the old phase parameter and the new phase parameter, respectively. FIG. 2 illustrates the old phase technique and consists essentially in processing the input seismic trace f(t) through Hilbert transform Hi[f(t)] and subsequently finding the arc tangent of the pointwise ratio of the Hilbert transform to the input trace data, i.e. ATAN2 of Hi[f(t)]÷f(t) which is the old instantaneous phase parameter. Thus, in FIG. 2, trace I represents a Ricker wavelet 22 representing an idealized noise free seismic trace, as disposed on zero value line 24 within a time window of approximately 0.55–0.75 seconds. To trace I there is added a significant amount of random noise n to provide a trace II signal 26 representing the real seismic trace f(t). Thus, trace I consists of a signal which is the second derivative of a Gaussian and hence has no D-C component, and trace II is the same trace I to which uniform, zero-mean random noise has been added at a signal-to-noise ratio of 10:1. Trace III represents the Hilbert transform Hi[f(t)] of trace II and there is illustrated the positive advance of $\pi/2$ radians with all random noise receiving similar phase shift. It is clear that outside of the time window 0.55 to 0.75 seconds, the trace is essentially noise and that the effect of the Hilbert transform is localized to the same time window as the original wavelet 22. Trace 30 then represents the old phase parameter as the arc tangent is taken of the pointwise ratio of the Hilbert transformed trace III to the original trace II. Thus, $$\phi(t) = ATAN2 \frac{Hi[f(t)]}{f(t)} \quad (1)$$

FIG. 3 in like manner shows the development of the new instantaneous phase parameter. Trace I and trace II of FIG. 3 are the same as trace I and trace II of FIG. 2. Then comes the departure, trace II 26 is then rectified, both noise and signal values, to produce an absolute value trace III 32 of doubled relative frequency and positive value. If trace II 26 is denoted by f(t), then trace III 32 may be represented as $$|f(t)| \quad (2)$$

In the next step, the Hilbert transformation of the absolute value trace 32 yields a trace 34 which is entirely different from the counterpart Hilbert transform trace 28 in the old phase representation of FIG. 2. The Hilbert transform may be represented as $$Hi[|f(t)|]. \quad (3)$$

It will be noted that whereas the Hilbert transformed trace 28 of FIG. 2 is essentially noise outside the narrow window from 0.55 to 0.75 seconds, the Hilbert transformed trace 34 of the rectified data in FIG. 3 has positive and negative tails extending a considerable distance beyond that window.

In effect, the Hilbert transform 34 of the rectified trace has a similar appearance to what would be obtained if a delta function in the presence of noise had been Hilbert-transformed. The effect of rectification on the Hilbert transform of the trace is to make the signal dominant and to suppress the noise. Further, rectification causes the effects of the Hilbert transform to be no longer localized to the time window as defined by the original Ricker wavelet signal 22.

Trace V of FIG. 3 illustrates the new instantaneous phase signal values 36 after computation wherein the arc tangent is taken of the pointwise ratio of the Hilbert transform 34 to the original rectified trace value 40 as represented by $$NEW\phi_t = ATAN2 \frac{Hi[|f(t)|]}{|f(t)|}. \quad (4)$$

Similar to Hilbert transform trace 34, nearly all noise peaks prior to the effective time window are subverted to negative values as the new phase wavelet 36 appears crisply at the 0.65 second time line with subsequent signal tails and noise 38 appearing in the positive data value area above zero-mean line 24.

The new phase technique as represented in FIG. 3 yields superior results to the old phase technique due to the effect that the rectification has on both signal and noise. The rectification process brings about an unusual type of non-linear filtering. The noise, e.g. trace 26 of FIG. 3, varies from −1 to 1 and after rectification as shown at trace 32, varies from 0 to 1. Also, the large negative swing of the second derivative of the Gaussian wavelet 22 has now become positive as at main peak 40 on the 0.65 second time line. This rectification has increased the D-C value from 0 in trace 26 to some positive value within the shaded area of trace 32.

The effect of the rectification is even more evident upon comparison of the Hilbert transform curves 28 of FIG. 2 and 34 of FIG. 3. The old phase Hilbert transform 28 of FIG. 2 is the Hilbert transform of signal plus noise. It is clear that, outside the time window 0.55 to 0.75 seconds, the trace is essentially noise. Thus, the effect of the Hilbert transform is localized to the same time window as the original wavelet. This is explained by the fact that, for the impulse response of the Hilbert transform, the positive and negative 1/t tails cancel each other out away from the wavelet leaving only residual noise. On the other hand, referring to the Hilbert transform trace IV 34 of FIG. 3, since the trace values 40 are strictly positive, the tails do not cancel out. Thus, the Hilbert transform trace takes on the appearance of a Hilbert-transformed delta function plus positive noise, as previously discussed.

It is upon comparison of the old and new phase traces, trace IV 30 in FIG. 2 and trace V 36 in FIG. 3, that the effects of the rectification may be still further clarified. In trace IV 30, the old phase trace is randomly noisy outside the time window 0.55 to 0.75 second where the main signal is located, and the random noise outside of the 0.55 to 0.75 second window jumps randomly from $-\pi$ to $+\pi$. Thus, if on a variable intensity display, $+\pi$ was assigned to white and $-\pi$ was assigned to black, the phase trace from 0 to 0.55 seconds and from 0.75 to 1.0 seconds would have a speckled appearance. In this case, a spurious noise event of duration 0.05 second appears at 0.45 second. Thus, the only coherent event in the old phase trace IV 30 of FIG. 2 is a wavelet of duration equivalent to the original wavelet; however, because of being embedded or closely surrounded within an oscillating black and white background, it would be extremely difficult to pick out.

Conversely, the new phase trace 36, trace V in FIG. 3, is not randomly noisy outside of the main data window of 0.55 to 0.75 second. At the location of the main data peak, 0.65 second, there is a crisp transition from negative to positive. Away from the wavelet, the tails of the Hilbert transform dominate the noise, and the phase is very near π/2 on one side and −π/2 on the other side.

Thus, it becomes clear why the new instantaneous phase technique, i.e. the phase of rectified trace referred to as PORT, is a more effective bright spot enhancer. Because of the rectification process, an event which shows up as a bright spot on the phase trace will be further enhanced because of the white and black shadows that are cast on either side of the event. This is primarily caused by the non-locality of the tails of the impulse response of the Hilbert transform. Also, because the noise appears as gray on the PORT trace, i.e. if black-white color assignment is used, it will not interfere with the demarcation of the shadows.

Yet another advantageous effect of the rectification process is the increase in apparent resolution. Comparison of the main dark peak of the event 30 in trace IV of FIG. 2 and the corresponding peak 36 in trace V of FIG. 3, demonstrates that the new phase or PORT trace peak is one-half the width of the old phase peak 30 (FIG. 2). This is due to the fact that a rectified sinusoid is twice the frequency of the original thereby to bring about more concise black-to-white and vice-versa transitions.

Figure 4:
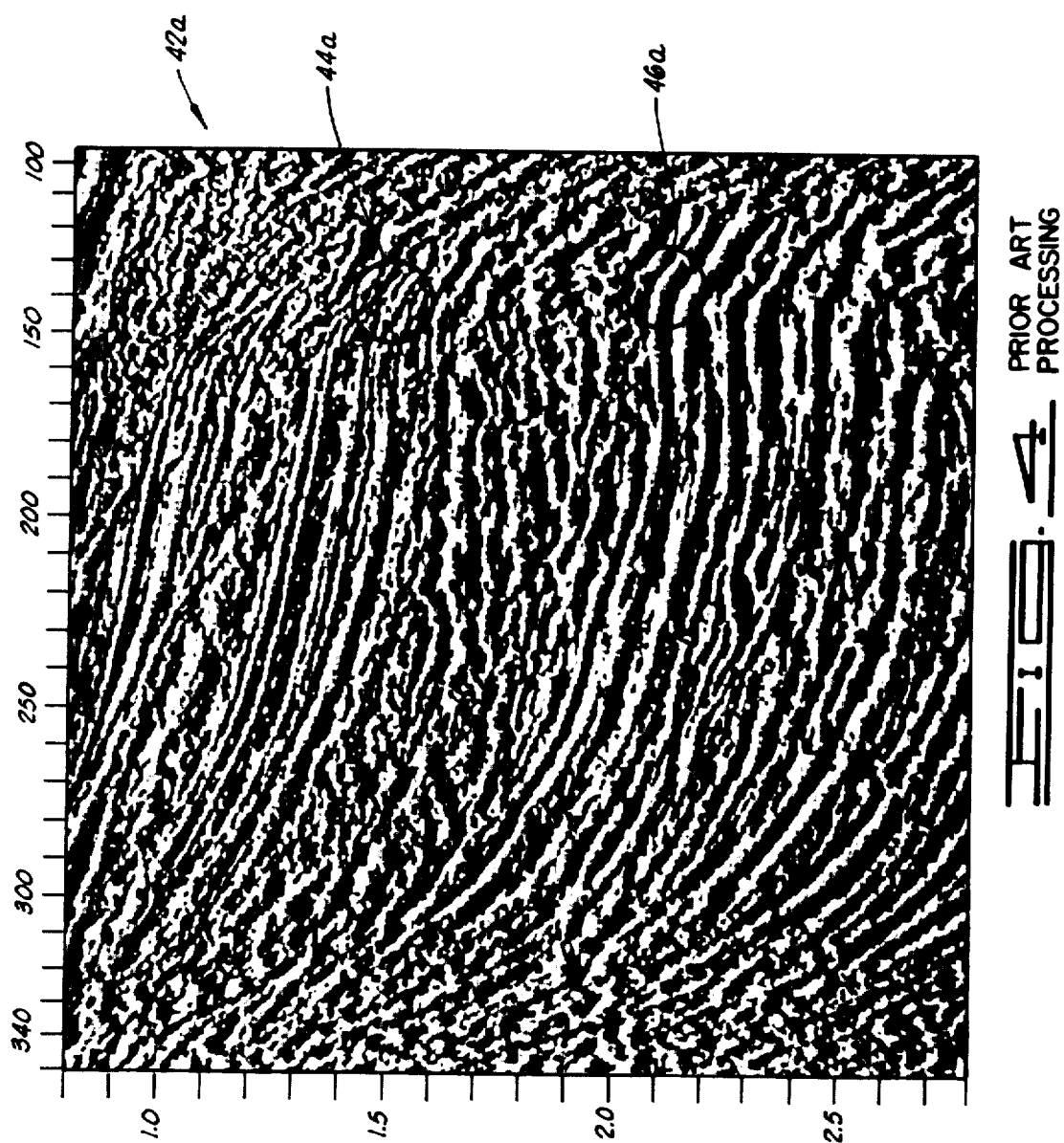
FIG. 4 is a depiction of a prior-type instantaneous phase display for a selected survey line.
Figure 5:
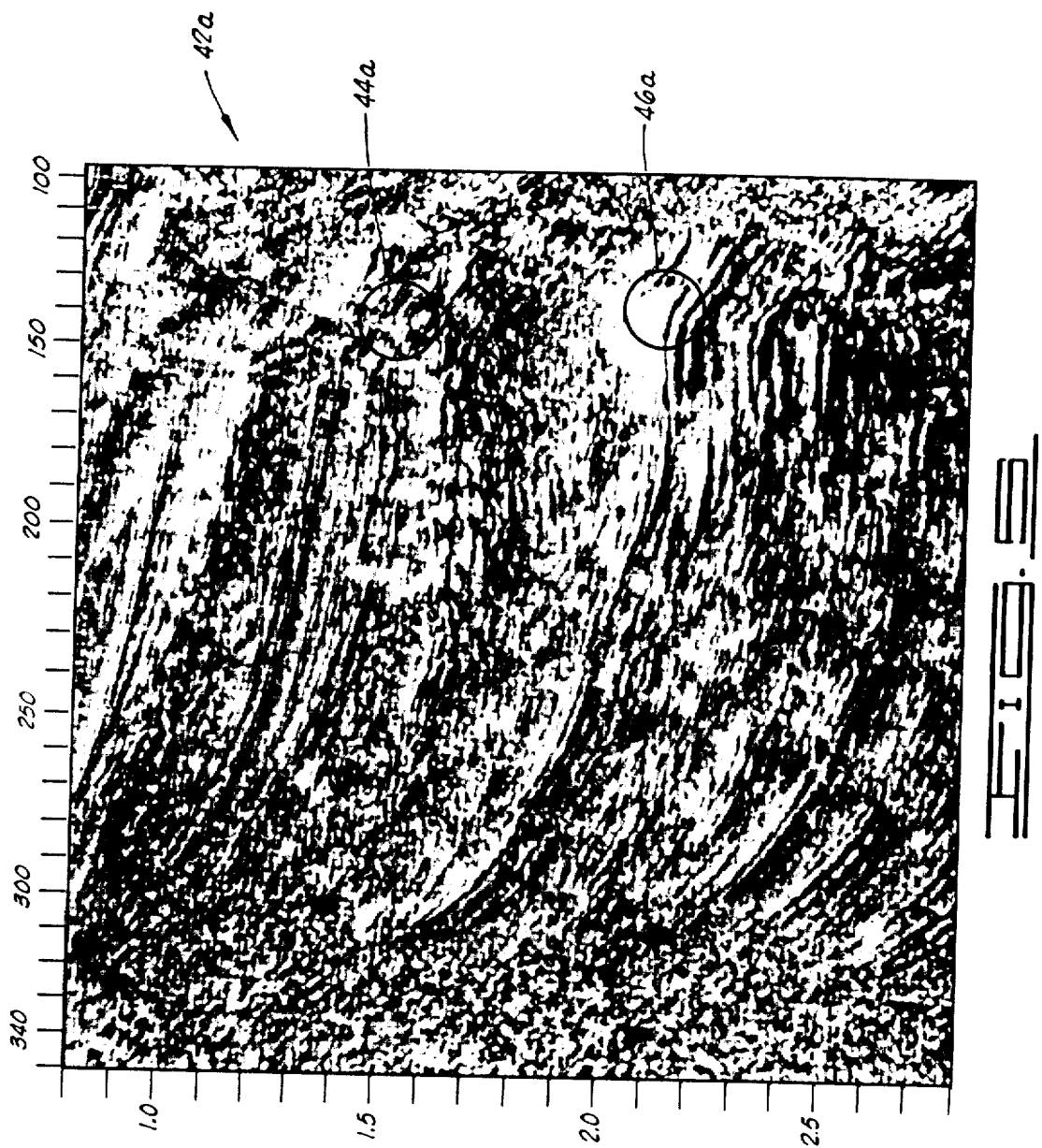
FIG. 5 is a photographic reproduction of a new instantaneous phase display for the same seismic survey line of FIG. 4.
Figure 6:
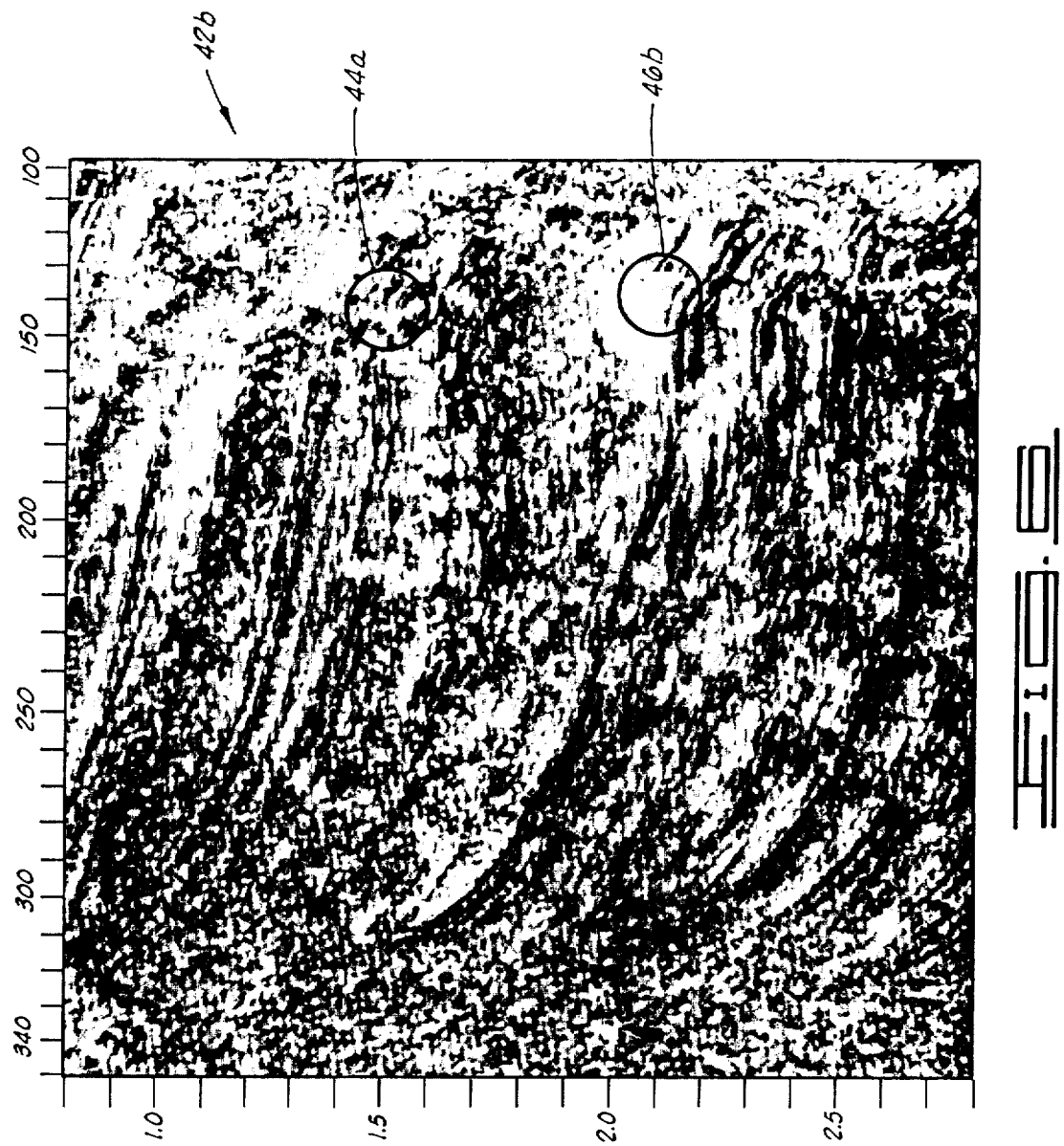
FIG. 6 is a reproduction of a color photograph of new instantaneous phase display for the same seismic survey line of FIGS. 4 and 5 but showing the phase of peaks and the phase of troughs further delineated by color presentation.

FIGS. 4, 5 and 6 provide an illustration by way of comparison that effectively demonstrates the value of the instantaneous phase of the rectified trace display. FIG. 4 illustrates an instantaneous phase display as developed using the conventional phase processing technique wherein the pre-processed seismic section is Hilbert transformed with subsequent phase processing. This is the process illustrated on a Ricker wavelet in traces I-IV of FIG. 2. Thus, a seismic section 42 is taken along a selected seismic survey line, shotpoint locations being illustrated along the abscissa as numbered from about 100 to 340. The ordinate of the section illustrates earth depth or seismic signal two-way travel time from about 0.8 seconds to 2.8 seconds. The old phase display section of FIG. 4 provides a relatively good output display of the phase parameter relative to the multiple subterranian strata within the seismic section 42. The general substratum make-up is illustrated as a regular, slightly dipping rightward earth structure. The right hand portion of section 42 shows some unusually sharply dipping, possibly faulted or other anomalous structure as at general area 44 as well as an area of extremely strong signal indication at area 46.

FIG. 5 shows the seismic section 42a as developed from the same input seismic section data as initially prepared and processed with the new phase parameter PORT. Thus, the increase in apparent resolution is immediately seen as is the specific highlighting of bright spot areas which provide the interpreter with specific hydrocarbon data. The individual stratum structure of section 42a is rendered much more clear in the new phase display (FIG. 5) and the fault structure at location 44a is more clearly defined as is the high intensity or bright spot data at area 46a. In addition, other apparent faulting structures are delineated along the right hand side of the seismic section 42a. Simple side by side comparison of the section printouts of FIGS. 4 and 5 immediately show the improved data presentation and highlighting of the FIG. 5 or new phase display section. Thus, and referring also to traces IV and V of FIG. 3, bright spot indication is much enhanced since the Hilbert transform of the rectified trace effectively places nearly one-half of the random noise below the display gray level, and the tails of the Hilbert transform peaks, while remaining within the gray level, are still utilized to provide dramatic shading in the overall display.

FIG. 6 illustrates the same seismic section 42b when it is processed with the color highlighted new phase technique. Thus, section 42b of FIG. 5 is displayed as a composited color image. The new phase of peaks are displayed red, the new phase of troughs are displayed blue and the new phase of the entire trace is displayed green. Thus, in FIG. 6, the bright spot at area 46b is still apparent but there are now patterns of red and blue alternating downward therethrough to show specific phase changes as between peak and trough data indications. The same is true for the faulting structure as a unique red and blue pattern and down dipping sequence is apparent in the area 44a.

Figure 7:
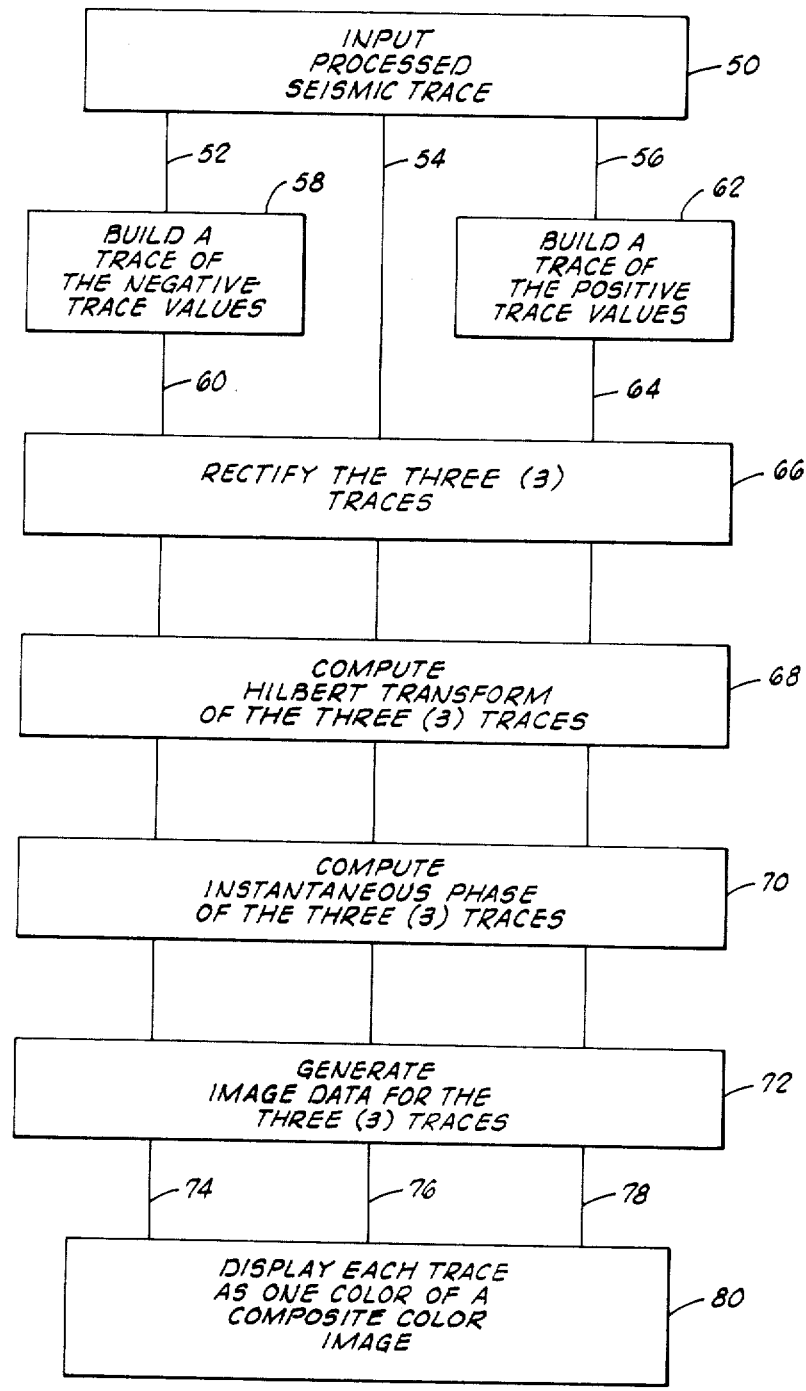
FIG. 7 is a flow diagram of the procedural steps for color highlighted new phase processing.

The flow diagram of FIG. 7 illustrates the color highlighted new phase procedures. Processed trace data input at stage 50 is separately handled via three lines 52, 54 and 56 as stage 58 outputs negative trace values on line 60 stage 62 outputs positive trace values on line 64 and full trace data is present on line 54. The three data lines 60, 54 and 64 are then separately processed through the new phase procedures of rectification stage 66, computation of respective Hilbert transform in stage 68, and computation of PORT or the respective new instantaneous phase traces at stages 70 and 72. Each of the PORT traces on output lines 74, 76 and 78 are applied to a color monitor for simultaneous display as at stage 80. Tri-modal output display may be interactively varied.

Figure 9:
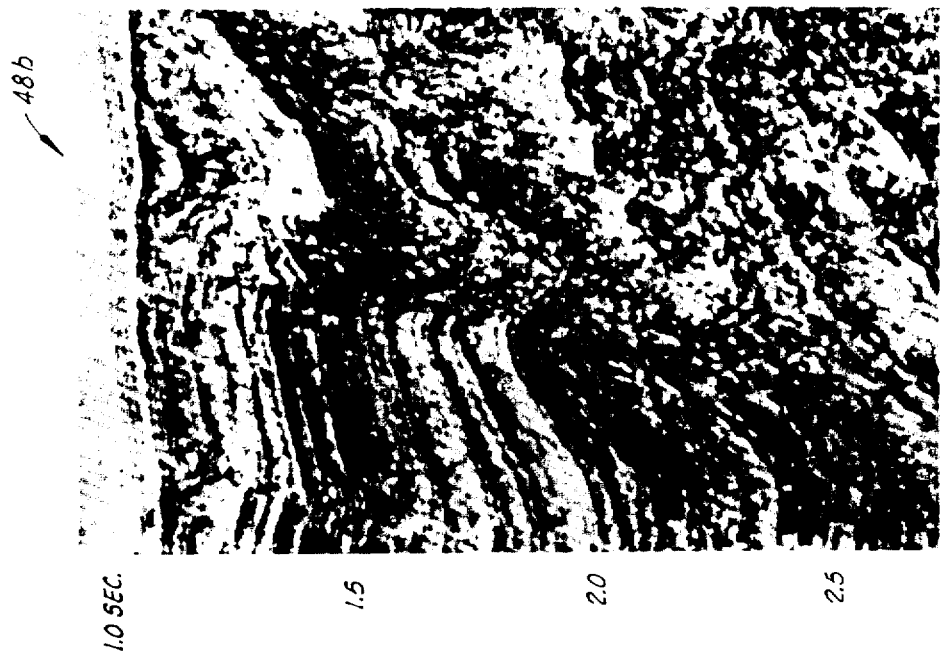
Figure 8:
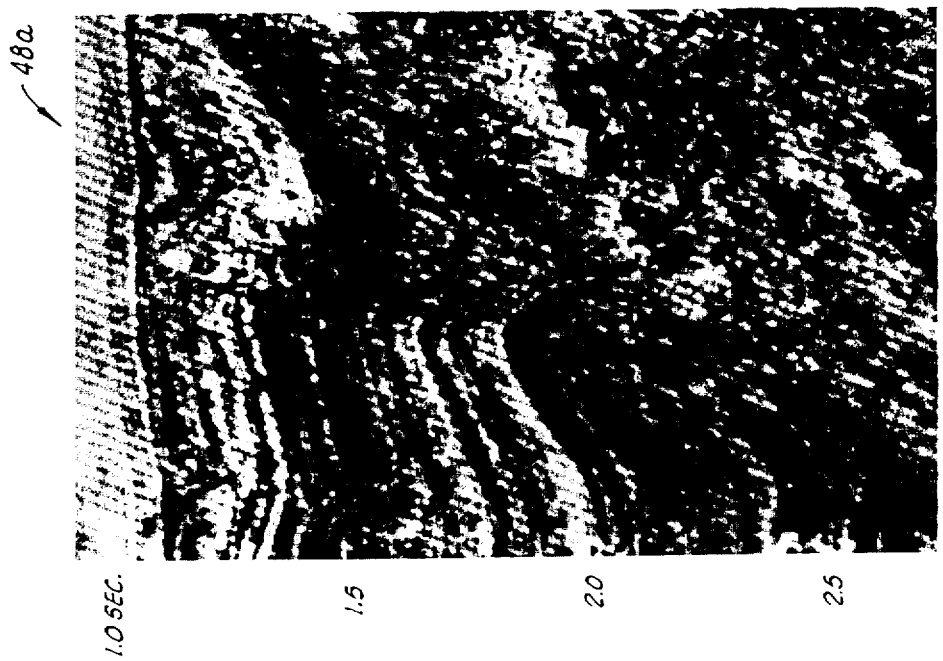
FIG. 8 is a photographic depiction of yet another seismic survey line in new instantaneous phase display that dramatically illustrates fault structure; and, FIG. 9 is a similar color photographic depiction of new instantaneous phase display of the seismic survey line of FIG. 7 with color variable indication as to the trace peak and trough structure.

FIGS. 8 and 9 illustrate a new phase display at FIG. 8 and the color highlighted new phase display at FIG. 9 for identical seismic section data 48. The new phase display section 48a is of particular importance as it illustrates, how the new phase display or PORT display data serves to increase resolution and clarify faulting and/or sharply dipping and diverging structures. The section 48b of FIG. 9 is the same section data as FIG. 8 when processed to effect color peak and trough highlighting as described relative to FIG. 7. Both FIG. 8 and FIG. 9 show a much increased subterranean structural content and order relative to the previous types of instantantous phase display, and both illustrate the obviously improved apparent resolution of the data depicted.

The foregoing discloses a novel method for processing of seismic trace data to bring about an improved form of instantaneous phase display wherein informational content and interpretability are much improved. In the technique of the present invention, seismic trace data, and the positive and negative parts of the trace data selected for instantaneous phase display are first rectified throughout prior to processing by Hilbert transformation and the subsequent phase processing step of deriving the arc tangent of the ratio of the Hilbert transform data to the original rectified trace. The phase of the rectified trace can be displayed as a black and white image, or displayed in a color composite with the phases of the rectified positive and negative parts of the trace data. These new phase displays provide a very greatly improved display output for subsequent interpretation, further processing or the like.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are defined as follows:

1. The method of developing a specific seismic data parameter from seismic trace data, comprising:
   receiving processed seismic trace data for a selected plane of investigation;
   rectifying said seismic trace data;
   producing the Hilbert transform of said rectified trace data;
   determining the instantaneous phase using Hilbert transformed rectified data; and
   interpreting geological significance of the plane of investigation using instantaneous phase of the rectified and transformed data.

2. The method of claim 1 wherein said step of interpreting comprises:
   visually displaying the instantaneous phase data for a selected portion of said plane of investigation.

3. The method as set forth in claim 2 wherein said step of visually displaying comprises:
   generating image data for said instantaneous phase data; and
   outputting said image data on a visual display.

4. The method as set forth in claim 3 which further includes:
   using multi-color video display and assigning different colors to different polarities of said instantaneous phase data.

5. The method as set forth in claim 4 which includes the step of:
   interactively varying the association of colors and color intensities in said multi-color video display.

* * * * *